US009369475B2

(12) United States Patent
Cohen

(10) Patent No.: US 9,369,475 B2
(45) Date of Patent: *Jun. 14, 2016

(54) SYSTEM AND METHOD FOR SECURING A THIRD PARTY COMMUNICATION WITH A HOSTING WEB PAGE

(71) Applicant: Sizmek Technologies Ltd., Herzliya (IL)

(72) Inventor: Efraeim Cohen, Herzliya (IL)

(73) Assignee: Sizmek Technologies Ltd., Herzliya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 14/674,223

(22) Filed: Mar. 31, 2015

(65) Prior Publication Data

US 2015/0207803 A1    Jul. 23, 2015

Related U.S. Application Data

(63) Continuation of application No. 13/712,075, filed on Dec. 12, 2012, now Pat. No. 8,997,178, which is a continuation of application No. 12/610,826, filed on Nov. 2, 2009, now Pat. No. 8,347,352.

(60) Provisional application No. 61/193,169, filed on Nov. 3, 2008.

(51) Int. Cl.
| G06F 17/30 | (2006.01) |
| H04L 29/06 | (2006.01) |
| G06F 21/53 | (2013.01) |
| G06F 9/54  | (2006.01) |
| G06Q 30/02 | (2012.01) |
| H04L 17/30 | (2006.01) |
| G06F 15/173 | (2006.01) |

(52) U.S. Cl.
CPC .............. *H04L 63/123* (2013.01); *G06F 9/547* (2013.01); *G06F 21/53* (2013.01); *G06Q 30/0277* (2013.01); *H04L 63/0281* (2013.01)

(58) Field of Classification Search
CPC ........... H04L 29/06; G06F 9/54; G06Q 30/02
USPC .......... 713/168–174, 182–186, 202; 709/206, 709/225, 229, 249, 389; 726/2–8
See application file for complete search history.

(56) References Cited

U.S. PATENT DOCUMENTS

| 2007/0113282 A1 | 5/2007 | Ross |
| 2008/0282338 A1 | 11/2008 | Beer |
| 2008/0313648 A1 | 12/2008 | Wang et al. |

(Continued)

*Primary Examiner* — Evans Desrosiers
(74) *Attorney, Agent, or Firm* — M&B IP Analysts, LLC

(57) ABSTRACT

A system and method for providing secure communications between third parties and hosting web pages. The method includes uploading a hosting web page to a client device, the hosting web page includes at least a sand-box proxy and a sand-box engine; uploading a third party module to the hosting web page; determining whether a proxy API call received from the third party module meets at least one validation rule, the proxy API call includes at least a script and a payload parameter provided by the third party module; for each validation rule, upon determining that the proxy API call does not meet the validation rule, modifying the script to meet the validation rule; generating an engine API call including at least the payload parameter validating the engine API call; and upon validation of the engine API call, executing, by the sand-box engine over the hosting web page, the payload parameter.

11 Claims, 3 Drawing Sheets

(56) References Cited

U.S. PATENT DOCUMENTS

| | | | |
|---|---|---|---|
| 2009/0070869 A1* | 3/2009 | Fan | G06F 21/51 726/22 |
| 2009/0132713 A1 | 5/2009 | Dutta et al. | |
| 2009/0177527 A1* | 7/2009 | Flake | G06Q 10/10 705/14.16 |

* cited by examiner

SYSTEM AND METHOD FOR SECURING A THIRD PARTY COMMUNICATION WITH A HOSTING WEB PAGE

CROSS-REFERENCE TO RELATED APPLICATIONS

This application is a continuation of U.S. patent application Ser. No. 13/712,075 filed on Dec. 12, 2012, now allowed, which is a continuation of U.S. patent application Ser. No. 12/610,826 filed on Nov. 2, 2009, now U.S. Pat. No. 8,347,352. The Ser. No. 12/610,826 application claims the benefit of U.S. Provisional Application No. 61/193,169 filed on Nov. 3, 2008. All of the applications referenced above are herein incorporated by reference

TECHNICAL FIELD

The present disclosure relates generally to securing mashup web pages.

BACKGROUND

Web browsers are increasingly becoming a single-stop resource for computing needs including information access, personal communications, e-commerce and much more. Consequently, web pages are designed to combine data and functionality from two or more external sources to create a new service. In the related art, such web pages are known as "mashup pages."

The mashup technology allows integrating data and functionality into a web page using one or more open application programming interfaces (APIs). A prime example of a mashup web page is an online advertisement hosted within a page, typically in a form of a banner. The banner generally promotes a specific vendible product and when it is clicked upon, the user is linked, for example, to the advertiser's site, where more detailed information is provided about the vendible product. An online advertisement is typically displayed as a combination of text, audio, still images, animation, video, and interactivity content forms. Different content types may be different objects of a rich-media advertisement. Rich media content can be downloadable or may be embedded in a webpage and can be viewed using a media player. The media player may be a plug-in or an offline application. An example for a rich media format and player is Flash provided by Adobe®.

The mashup web page is typically referred to as a "hosting web page" and the external objects as "third party modules." The drawback of the mashup architecture is that the hosting web page is vulnerable to attacks from third party modules, as these modules have full access to APIs of the hosting web page. In the related art, solutions to a secure hosting web page include, for example, browser abstractions. The browser abstractions facilitate resource management and access control. The browser abstractions are implemented using dedicated HTML tags, e.g., <sandbox> and a script proxy provided as an extension of a web browser.

The disadvantage of this approach is that APIs of hosting pages are still exposed to malicious third party modules. In addition, in order to secure hosting web pages, a web browser installed in each client should be updated to include the script proxy. In today's environment, where different vendors provide different web versions, the security approach of web browser abstractions is not feasible.

It would therefore be advantageous to provide an efficient solution for securing web pages hosting third party modules.

SUMMARY

Certain embodiments disclosed herein include a method for providing secure communications between third parties and hosting web pages. The method comprises uploading a hosting web page to a client device, wherein the hosting web page includes at least a sand-box proxy and a sand-box engine; uploading a third party module to the hosting web page; determining whether a proxy application programming interface (API) call received from the third party module meets at least one validation rule, wherein the proxy API call includes at least a script and a payload parameter provided by the third party module; for each validation rule, upon determining that the proxy API call does not meet the validation rule, modifying the script to meet the validation rule; generating an engine API call including at least the payload parameter validating the engine API call; and upon validation of the engine API call, executing, by the sand-box engine over the hosting web page, the payload parameter.

Certain embodiments disclosed herein also include a system for secure communications between third parties and hosting web pages. The system comprises a processing unit; and a memory, the memory containing instructions that, when executed by the processing unit, configure the system to: upload a hosting web page to a client device, wherein the hosting web page includes at least a sand-box proxy and a sand-box engine; upload a third party module to the hosting web page; determine whether a proxy application programming interface (API) call received from the third party module meets at least one validation rule, wherein the proxy API call includes at least a script and a payload parameter provided by the third party module; for each validation rule, upon determining that the proxy API call does not meet the validation rule, modify the script to meet the validation rule; generate an engine API call including at least the payload parameter; validate the engine API call; and upon validation of the engine API call, execute, by the sand-box engine over the hosting web page, the payload parameter.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
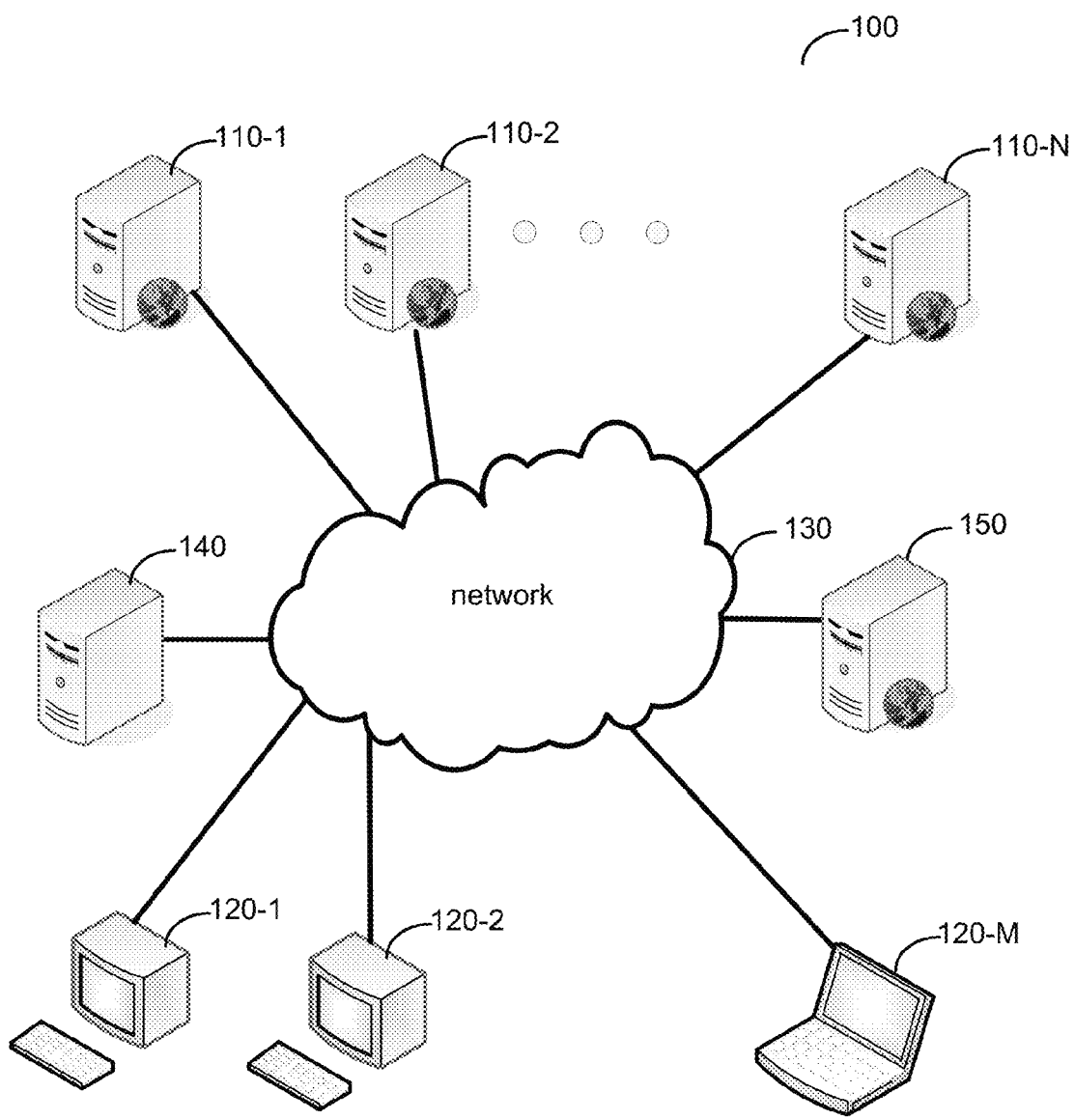
FIG. 1 is a diagram illustrating a network system utilized to describe the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

FIG. 1 shows an exemplary illustration of a network system 100 utilized to describe the disclosed embodiments. The network system 100 includes a plurality of servers 110-1 through 110-N (collectively referred to as "server 110") and clients 120-1 through 120-M (collectively referred to as "client 120") that communicate through a network 130 which may be, for example, a wide area network (WAN), that enables connectivity such as Internet connectivity, the network 130 further including at least one publisher server 140. A client 120 includes a web browser, such as Microsoft® Internet Explorer®, allowing a user to view and navigate through web pages downloaded from one or more of the servers 110 and/or the publisher server 140.

The publisher server 140 is communicatively connected to the network 130 and is capable of embedding third party modules in hosting web pages downloaded from the servers 110 and further uploading the web pages with the third party modules to web browsers (not shown) of the clients 120. The third party modules are downloaded from one or more servers 150 belonging to one or more third party vendors. In accordance with an embodiment, third party modules are online advertisements and the vendors are advertisement agencies. In various embodiments, all third party modules are embedded in a hosting web page, which is hosted by the publisher server 140, and the third party modules cannot directly access APIs of the hosting web page.

Figure 2:
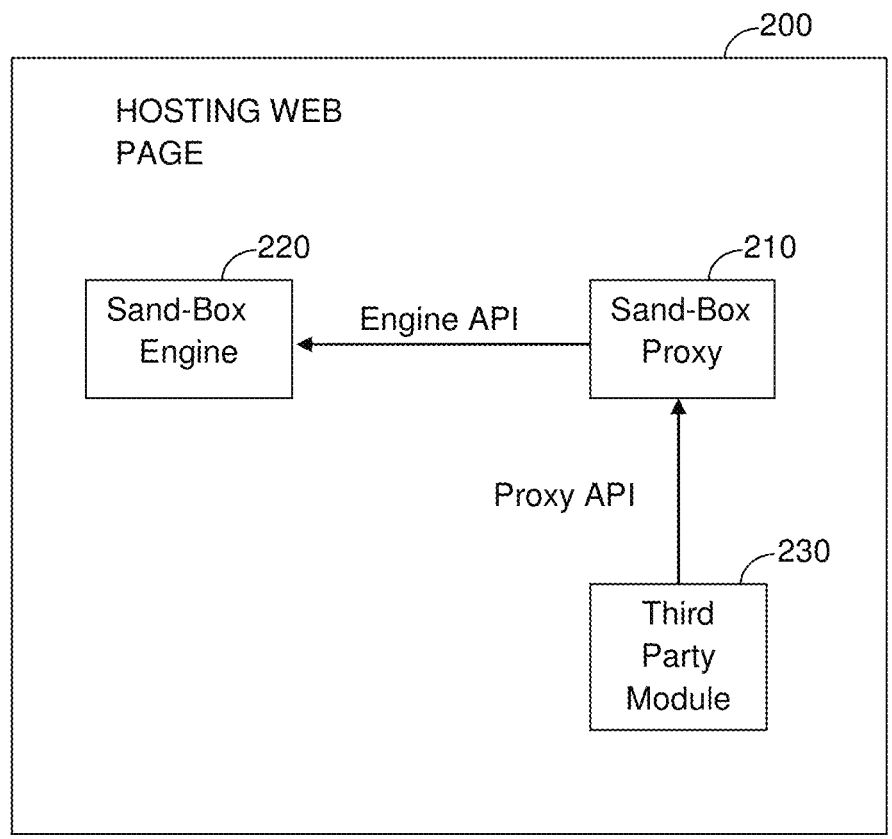
FIG. 2 is a diagram of a hosting web page architecture provided according to an embodiment.

A non-limiting and exemplary diagram of a hosting web page 200 constructed in accordance with an embodiment of the invention is shown in FIG. 2. The hosting web page 200 includes a sand-box proxy 210 and a sand-box engine 220 that together provide a security protection layer for the hosting web page 200. The sand-box proxy 210 and the sand-box engine 220 block a third party module 230 from directly executing any actions on the hosting web page 200. With this aim, the sand-box proxy 210 dynamically loads the third party module 230 to the hosting web page 200 and, once uploaded, the third party module 230 cannot directly call or access the hosting web page 200 using an API exposed by the hosting web page 200. Rather, the third-party module 230 can communicate only with the sand-box proxy 210 through a predefined API (hereinafter referred to as the "proxy API") exposed by the sand-box proxy 210. The proxy API includes at least a payload parameter encapsulating an executable script. This executable script is typically a process that is executed by the sand-box engine 220 to run over the hosting web page 200. It should be noted that a typical architecture of a hosting web page (mashup page) does not include the sand-box proxy 210 and the sand-box engine 220. Thus, according to various embodiments, the third-party module 230 can be blocked from running a harmful script over the hosting web page 200.

The sand-box proxy 210 receives a call from the proxy API and determines if the call is potentially harmful using a set of validation rules. For example, if the third party module 230 tries to access a restricted network resource, the call may be determined to be potentially harmful. In an embodiment, only validated proxy API calls are sent to the sand-box engine 220. The sand-box proxy 210 generates a new API call (hereinafter the "engine API") which may be communicated to the sand-box engine 220. The engine API has a predefined format having an API (method) name and parameters. The payload portion includes the proxy API, i.e., the script to be executed.

The sand-box engine 220 performs a set of checks to determine if the script included in the payload of the engine API is potentially harmful. Validated scripts are safe for execution. It should be appreciated that the sand-box proxy 210 and the sand-box engine 220 control all communications from the third-party module 230 to the hosting web page 200, thereby providing a sealed and safe environment for the hosting web page 200.

In certain implementations where the hosting web page 200 includes more than one third party module 230, a single sand-box proxy 210 handles API calls from a single third-party module 230. The sand-box engine 220 validates and executes all API calls received from the sand-box proxies 210.

The sand-box proxy 210, the sand-box engine 220, and the third party module 230 may be implemented as executable code (e.g., a Flash "swf" file) that is temporarily stored in a non-transitory computer readable medium in a client (e.g., one of the clients 120) and executed thereon. The client 120 may be any computing device including at least a processor and a computer readable medium. In certain embodiments, the sand-box engine 220 and one or more sand-box proxies 210 can be implemented as part of a secure agent.

Figure 3:
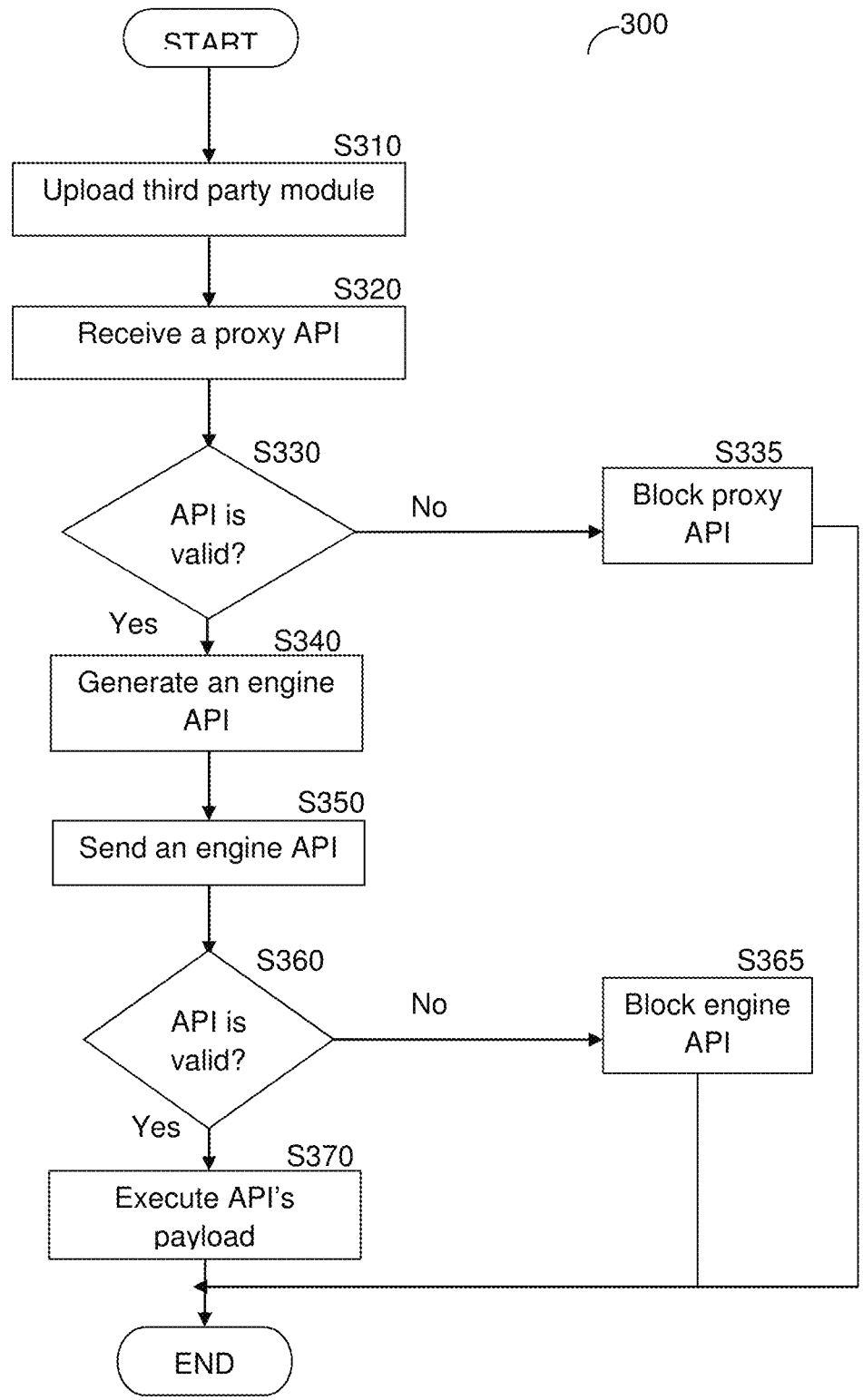
FIG. 3 is a flowchart illustrating a method for securing a hosting web page.

FIG. 3 shows an exemplary and non-limiting flowchart 300 illustrating a method for securing hosting web pages (mashup pages) implemented in accordance with an embodiment. In a non-limiting embodiment, the method may be performed by the sand-box proxy 210 and the sand-box engine 220 shown in FIG. 2.

At S310, a third party module is uploaded to a hosting web page by a sand-box proxy. Thereafter, the sand-box proxy and the third-party module can communicate with each other using a proxy API exposed by the sand-box proxy. The format of the proxy API may be predefined and includes at least an API name and an API's parameters. As a non-limiting example, the proxy API may be:

ExecuteScript(String Payload, Boolean isRunSync)

ExecuteScript is an API's name of a public method that the sand-box proxy exposes to the third party module. The third party module calls this method when there is a need to communicate with the hosting web page. Other examples for public methods may be resizeBrowserWindow, ShakeBrowserWindow, and the like. Payload and isRunSync are the API's parameters. The Payload parameter is a string that includes a script that the proxy should delegate to the sand-box engine. The script could be a single function call or a block of inline script that the sand-box engine is required to execute once validated. The isRunSync parameter is a Boolean parameter (i.e., true/false) that indicates whether the script should be executed, by the sand-box engine, in a sequential mode or in a parallel mode. The sand-box engine can handle engine API calls received from one or more sand-box proxies either in a parallel manner or in a sequential manner. The calls are processed in the order determined by the isRunSync parameter.

At S320, a proxy API call sent by the third party module is received at the sand-box proxy. At S330, the content of the received API proxy's payload is validated by the sand-box proxy in order to detect malicious operations. This step is performed using one or more validation rules selected from a predefined set of rules.

A non-limiting example for a validation rule is a check performed to determine if a third-party module tries to read private information (e.g., a credit card number) from the hosting web page. Another example is a rule that scans for invalid third party network addresses through which the module can transfer information to malicious third party servers. Another example is a rule that checks for malicious code (e.g., a virus or a Trojan horse) in the script included in the payload parameter. This rule blocks attackers from breaching the sand-box environment and bypassing the proxy. A person with ordinary skill in the art can easily define a new set of validation rules based on the above teachings.

If the proxy API is valid, execution continues with S340; otherwise, at S335, the proxy API is blocked (i.e., the API call is not relayed to the sand-box engine). In accordance with another embodiment, the script in the proxy API's payload can be modified to correct security breaches. For example, a DOM of the hosting page can be restricted to a write only option in order to prevent reading of private information. As another example, any access to unknown servers' addresses can be blocked.

At S340, an engine API is generated by the sand-box proxy 210 by including at least the proxy API's payload in the engine API's parameters. The engine API may be formatted as described above. Once ready, at S350, the engine API is sent to the sand-box engine. At S360, the validity of the API call is checked. Specifically, the sand-box engine checks the received API using one or more rules selected from a predefined set of rules. One rule includes verification of the source of the engine API, i.e., if this API call originated from a known sand-box proxy. The rules described in detail above can also be utilized by the sand-box engine. If the engine API is determined to be valid, execution continues with S370 where the payload's content (or script) is executed by the sand-box engine 220; otherwise, at S365, the engine API is discarded.

The various embodiments disclosed herein can be implemented as hardware, firmware, software, or any combination thereof. Moreover, the software is preferably implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. A method for providing secure communications between third parties and hosting web pages, comprising:
   uploading a hosting web page to a client device, wherein the hosting web page includes at least a sand-box proxy and a sand-box engine;
   uploading a third party module to the hosting web page;
   determining whether a proxy application programming interface (API) call received from the third party module meets at least one validation rule, wherein the proxy API call includes at least a script and a payload parameter provided by the third party module;
   for each validation rule, upon determining that the proxy API call does not meet the validation rule, modifying the script to meet the validation rule;
   generating an engine API call including at least the payload parameter;
   validating the engine API call; and
   upon validation of the engine API call, executing, by the sand-box engine over the hosting web page, the payload parameter.

2. The method of claim 1, further comprising:
   checking if the engine API call is received from a known sand-box proxy; and
   validating the script included in the engine API call.

3. The method of claim 2, wherein each validation rule is selected from a set of predefined rules.

4. The method of claim 3, wherein the sand-box engine and the sand-box proxy are embedded in the hosting web page.

5. The method of claim 1, wherein the hosting web page is at least a mashup web page.

6. A non-transitory computer readable medium having stored thereon instructions for causing one or more processing units to execute the method according to claim 1.

7. A system for secure communications between third parties and hosting web pages, comprising:
   a processing unit; and
   a memory, the memory containing instructions that, when executed by the processing unit, configure the system to:
   upload a hosting web page to a client device, wherein the hosting web page includes at least a sand-box proxy and a sand-box engine;
   upload a third party module to the hosting web page;
   determine whether a proxy application programming interface (API) call received from the third party module meets at least one validation rule, wherein the proxy API call includes at least a script and a payload parameter provided by the third party module;
   for each validation rule, upon determining that the proxy API call does not meet the validation rule, modify the script to meet the validation rule;
   generate an engine API call including at least the payload parameter
   validate the engine API call; and
   upon validation of the engine API call, execute, by the sand-box engine over the hosting web page, the payload parameter.

8. The system of claim 7, wherein the system is further configured to:
   check if the engine API call is received from a known sand-box proxy; and
   validate the script included in the engine API call.

9. The system of claim 8, wherein each validation rule is selected from a set of predefined rules.

10. The system of claim 9, wherein the sand-box engine and the sand-box proxy are embedded in the hosting web page.

11. The system of claim 7, wherein the hosting web page is at least a mashup web page.

* * * * *